ём
United States Patent
Akamine et al.

(10) Patent No.: US 10,914,832 B2
(45) Date of Patent: Feb. 9, 2021

(54) ESTIMATION APPARATUS

(71) Applicant: DENSO CORPORATION, Kariya (JP)

(72) Inventors: Yusuke Akamine, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 165 days.

(21) Appl. No.: 16/350,093

(22) PCT Filed: Mar. 22, 2017

(86) PCT No.: PCT/JP2017/011513
§ 371 (c)(1),
(2) Date: Sep. 21, 2018

(87) PCT Pub. No.: WO2017/164250
PCT Pub. Date: Sep. 28, 2017

(65) Prior Publication Data
US 2019/0293778 A1    Sep. 26, 2019

(30) Foreign Application Priority Data
Mar. 22, 2016    (JP) .................................. 2016-057038

(51) Int. Cl.
*G01S 13/58* (2006.01)
*G01S 7/41* (2006.01)
*G01S 13/931* (2020.01)
*G01S 13/93* (2020.01)
*G01S 13/62* (2006.01)

(52) U.S. Cl.
CPC ............. *G01S 13/589* (2013.01); *G01S 7/411* (2013.01); *G01S 13/62* (2013.01); *G01S 13/93* (2013.01); *G01S 13/931* (2013.01)

(58) Field of Classification Search
CPC ........ G01S 13/589; G01S 13/93; G01S 13/62; G01S 7/411; G01S 13/931; G01S 7/415
USPC ................................ 342/107, 173, 134, 156
See application file for complete search history.

(56) References Cited

U.S. PATENT DOCUMENTS 9,868,441 B2 *    1/2018    Tokimasa ............. B60W 30/16
2003/0052813 A1 *    3/2003    Natsume ............... G01S 13/345
342/70
(Continued)

FOREIGN PATENT DOCUMENTS

DE    102013011239 A1    1/2015
JP    8-129067 A    5/1996
(Continued)

*Primary Examiner* — Bo Fan
(74) *Attorney, Agent, or Firm* — Maschoff Brennan

(57) ABSTRACT

An estimation apparatus of the present disclosure includes a same-object point information acquiring section, a candidate estimating section, and a direction estimating section. The candidate estimating section estimates, as a candidate direction, a direction that is matched with an arbitrary horizontal direction upon determining that the relative speeds gradually decrease along the arbitrary horizontal direction. The candidate estimating section estimates, as the candidate direction, an opposite direction of the arbitrary horizontal direction upon determining that the relative speeds gradually increases along the arbitrary horizontal direction. The direction estimating section estimates a moving direction of the same object based on the candidate direction.

5 Claims, 10 Drawing Sheets

(56) References Cited

U.S. PATENT DOCUMENTS

| | | | |
|---|---|---|---|
| 2013/0194129 A1* | 8/2013 | Kojima | G01S 7/22 342/114 |
| 2015/0061922 A1* | 3/2015 | Kishigami | G01S 13/42 342/147 |
| 2015/0323651 A1* | 11/2015 | Poiger | G01S 13/42 342/113 |

FOREIGN PATENT DOCUMENTS

| | | |
|---|---|---|
| JP | 2001-272466 | 10/2001 |
| JP | 2001-272466 A | 10/2001 |
| JP | 2002-341020 A | 11/2002 |

\* cited by examiner

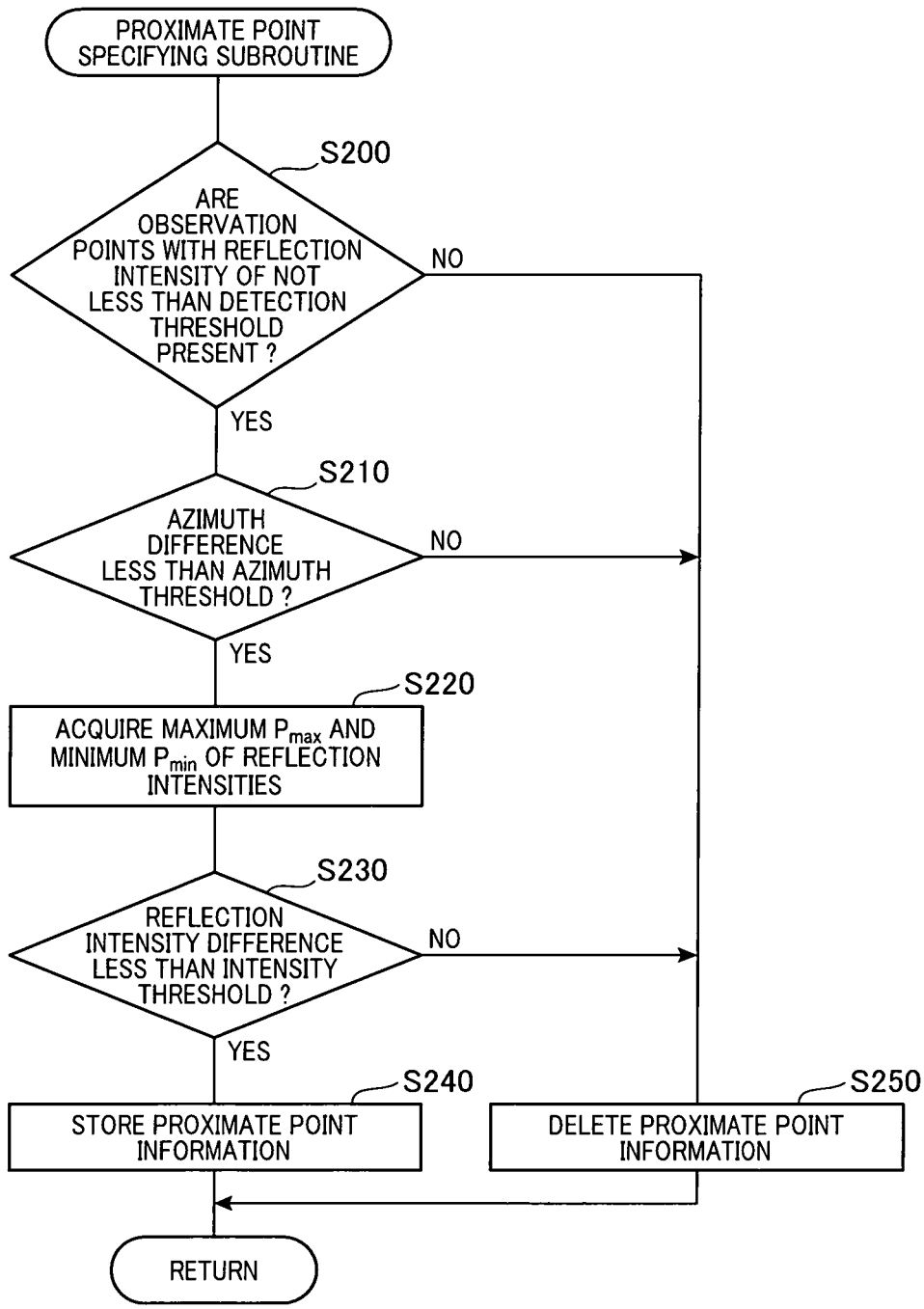

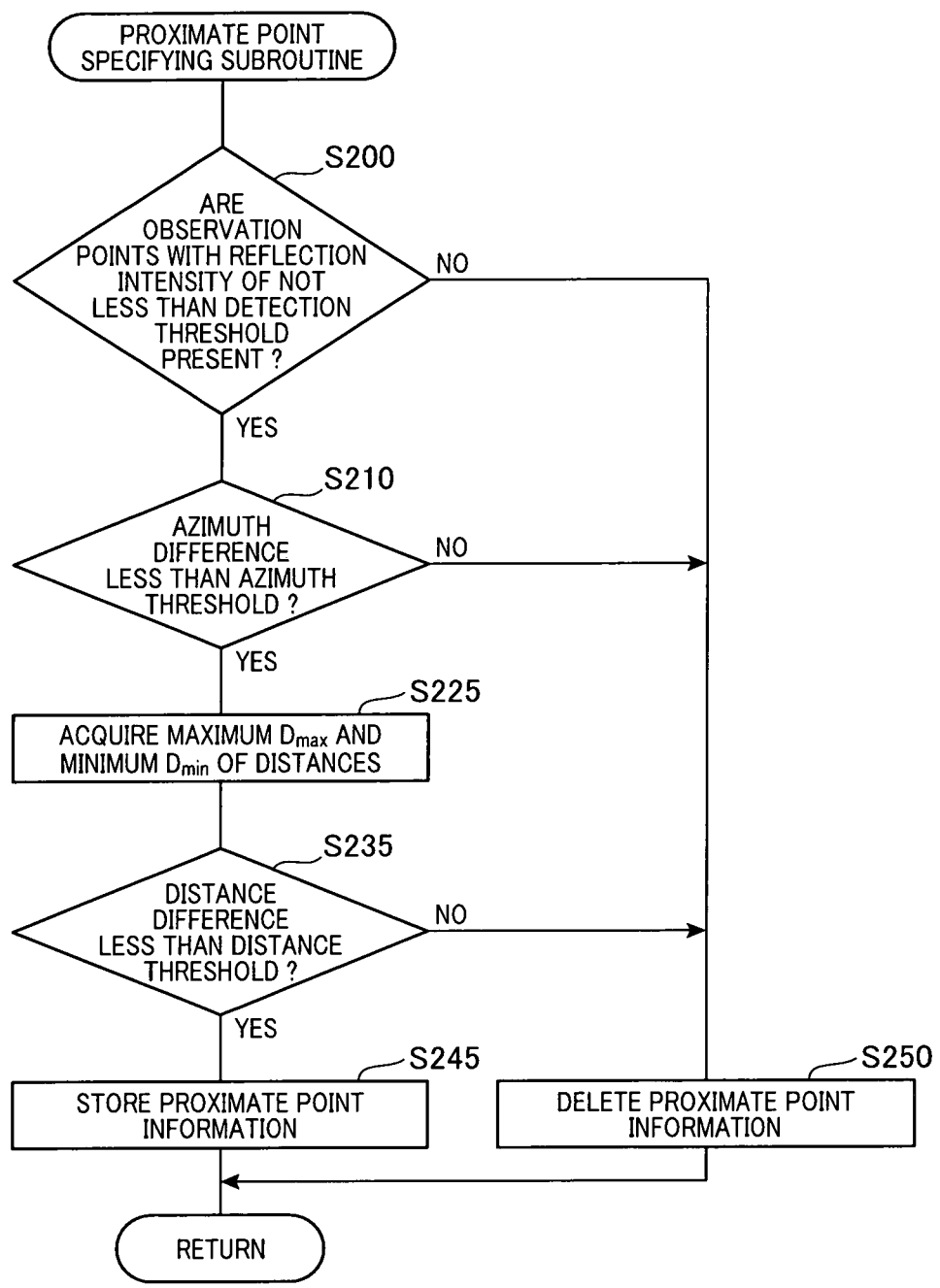

ESTIMATION APPARATUS

CROSS-REFERENCE TO RELATED APPLICATION

This application is a national stage application of PCT Application No. PCT/JP2017/011513, filed on Mar. 22, 2017, which claims priority from Japanese Patent Application No. 2016-057038 filed in Japan Patent Office on Mar. 22, 2016, the entire contents of which are incorporated herein by reference.

TECHNICAL FIELD

The present disclosure relates to a technique for estimating a moving direction of an object.

BACKGROUND ART

In a technique that is well known, a radar-wave transmitting and receiving task enables a distance to an object and an azimuth of the object around the vehicle to be detected. The radar waves include, for example, millimeter waves, radar waves, and ultrasonic waves.

PTL 1 set forth below discloses a technique that acquires results of the set of a detected distance and a detected azimuth relative to an object a plurality of times with time to thereby estimate a moving direction of the object.

CITATION LIST

Patent Literature

[PTL 1] JP 2001-272466 A

SUMMARY OF THE INVENTION

PTL 1 acquires results of the set of a detected distance and a detected azimuth relative to an object a plurality of times with time to thereby estimate a moving direction of the object. As a result of the studies conducted by the inventors, however, it has been found that, with the technique described in PTL 1, it takes time to estimate a moving direction of an object.

According to an aspect of the present disclosure, it is desirable that the time for estimating a moving direction of an object around the own vehicle is shortened.

According to an exemplary aspect of the present disclosure, there is provided an estimation apparatus a same-object point information acquiring section, a candidate estimating section, and a direction estimating section.

The same-object point information acquiring section is configured to acquire same-object information in which a horizontal azimuth of each same-object point relative to a vehicle is correlated to a relative speed of the corresponding same-object point relative to the vehicle. The same-object points are located on a same object, and each of the same-object points has reflected a radar wave.

The candidate estimating section is configured to
(1) Sequentially observe the relative speeds of the respective same-object points along an arbitrary horizontal direction
(2) Estimate, as a candidate direction, a direction that is matched with the arbitrary horizontal direction upon determining that the relative speeds gradually decrease along the arbitrary horizontal direction
(3) Estimate, as the candidate direction, an opposite direction of the arbitrary horizontal direction upon determining that the relative speeds gradually increases along the arbitrary horizontal direction The direction estimating section is configured to estimate a moving direction of the same object based on the candidate direction.

This configuration acquires information on the observation points located on the same object to thereby estimate the moving direction of the object. This eliminates the need of acquiring information on each of the observation points a plurality of times with time for estimating the moving direction of the object. That is, the estimation apparatus of the present disclosure makes it possible to estimate the moving direction of the same object in a shorter time than in the technique disclosed in PTL 1. The term "horizontal" herein is not limited to horizontal in a strict sense. The term "horizontal" does not have to be strictly horizontal if advantageous effects similar to the above are exerted.

The bracketed reference signs in the claims indicate correspondence with specific means described in the following embodiment as an example, and therefore should not limit the technical scope of the present disclosure.

BRIEF DESCRIPTION OF THE DRAWINGS

FIG. 10 is a flowchart illustrating a proximate point specifying subroutine.

FIG. 11 is a flowchart illustrating a proximate point specifying subroutine according to a modification.

DESCRIPTION OF THE EMBODIMENTS

Figure 1:
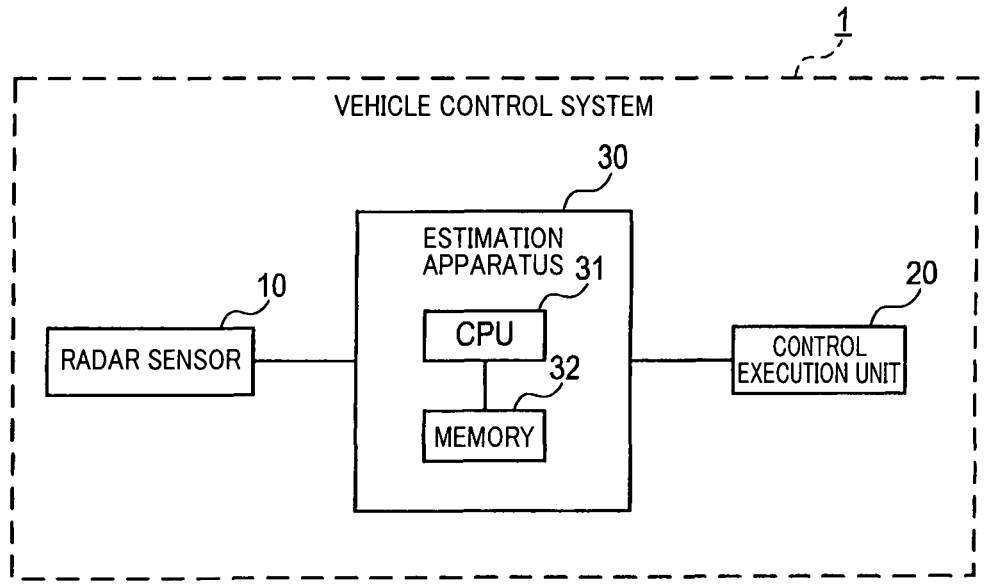
FIG. 1 is a block diagram illustrating the configuration of a vehicle control system and an estimation apparatus.

The following describes embodiments of the present disclosure with reference to the drawings.
(1. Configuration)
FIG. 1 shows a vehicle control system 1 installed in a vehicle. The vehicle control system 1 includes a plurality of radar sensors 10, a control execution unit 20, and an estimation apparatus 30. FIG. 1 shows only one radar sensor 10. It should be noted that an own vehicle mentioned below refers to a vehicle equipped with the vehicle control system 1.

The radar sensors 10 are respectively provided to the right and left end portions on the front side of the own vehicle. The term front side refers to a side closer to a driver's seat in the longitudinal direction of the own vehicle. It should be noted that the term rear side refers to a side opposite to the front side.

Figure 2:
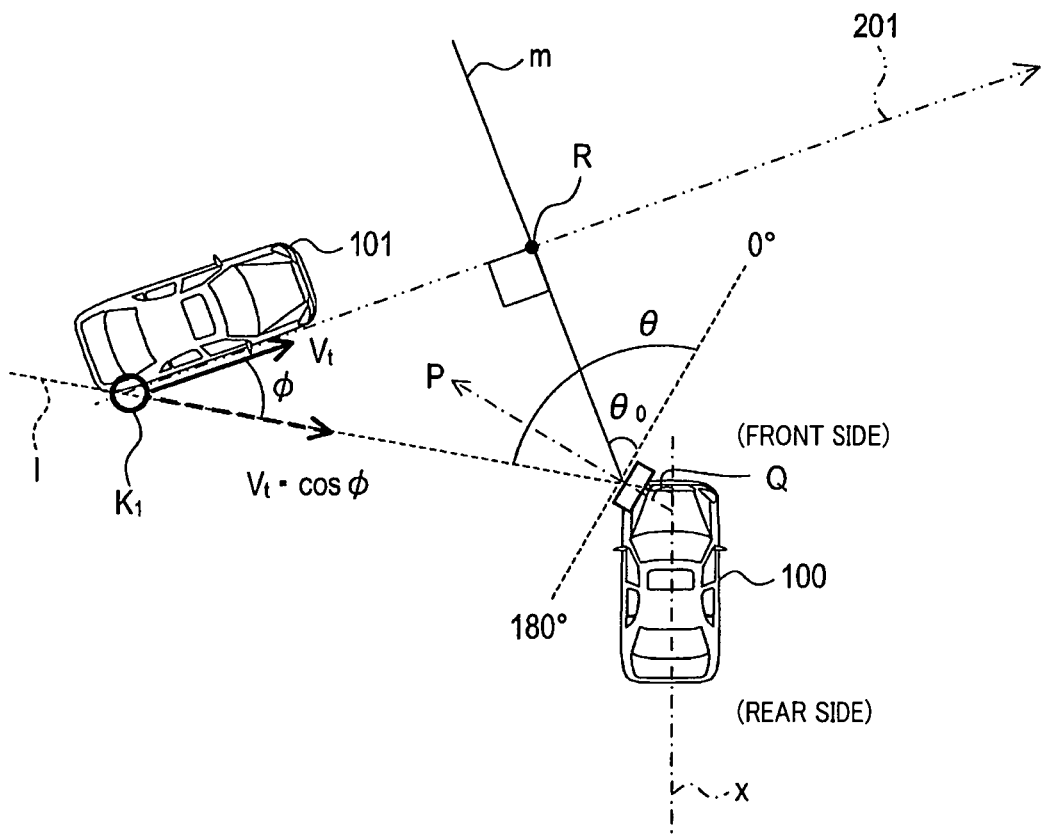
FIG. 2 is a diagram illustrating the mounting position of a radar sensor, and a zero point.

The following describes an example where the radar sensor 10 is provided to the left end portion on the front side of the own vehicle. As shown in FIG. 2, the radar sensor 10 is mounted such that the central axis P of a detection range of the radar sensor 10 is inclined outward by a predetermined angle Q with respect to an x axis. The term detection range herein refers to a range detectable by the radar sensor 10. The x axis indicates the longitudinal direction of an own vehicle 100.

The term outward herein refers to the left side with respect to the longitudinal direction of the own vehicle 100 if the radar sensor 10 is located at the left end portion on the front side of the own vehicle 100 as mentioned above. If the radar sensor 10 is located at the right end portion on the front side of the own vehicle 100, the term outward refers to the right side with respect to the longitudinal direction of the own vehicle 100. The term horizontal plane mentioned below refers to a plane perpendicular to a vertical direction. The term horizontal direction refers to any direction in the horizontal plane.

In the present embodiment, the detection range of the radar sensor 10 is set to a range of 0 degrees to 180 degrees in the horizontal plane. The azimuth of 0 degrees of the radar sensor 10 is oriented to the front side of the own vehicle 100. The azimuth of 90 degrees in the radar sensor 10 corresponds to the direction of the central axis P of the radar sensor 10.

The radar sensor 10 transmits radar waves using an array antenna and receives reflected radar waves via the array antenna to thereby detect distance, relative speed, azimuth, and reflection intensity in the detection range. The term distance herein refers to a distance from the radar sensor 10 to an observation point, that is, a distance from the own vehicle 100 to the observation point. The term relative speed herein refers to a speed of the observation point relative to the own vehicle 100. The term speed of the observation point relative to the own vehicle 100 refers to a speed of the observation point relative to a speed of the radar sensor 10, that is, a speed of the observation relative to the own vehicle 100. The term azimuth herein refers to an azimuth in which an observation point is present relative to the position of the radar sensor 10, that is, an azimuth in which an observation point is present relative to the own vehicle 100.

The term reflection intensity herein refers to a reflection intensity of radar waves at an observation point. The term observation point herein refers to a position of an object that has reflected radar waves transmitted from the radar sensor 10. The term position of an object herein refers to a position of part of the object, the part that has reflected the radar waves. The radar sensor 10 outputs observation point information to the estimation apparatus 30. The observation point information shows correlation between distance, relative speed, azimuth, and reflection intensity, for each observation point.

The estimation apparatus 30 in the present embodiment is an electronic control device that controls the vehicle control system 1. The estimation apparatus 30 is provided with a microcomputer including a CPU 31 and a semiconductor memory device 32 (termed memory 32 hereinafter) including, for example, a RAM, a ROM, and a flash memory.

The CPU 31 executes programs stored in a non-trajectory tangible storage medium to thereby implement functions of the estimation apparatus 30. For example, the ROM corresponds to the non-transitory tangible recording medium that stores programs. Executing the programs enables methods corresponding to the programs to be executed. The estimation apparatus 30 may include one microcomputer, or may include a plurality of microcomputers.

The method of implementing the functions of the estimation apparatus 30 is not limited to use of software, but part or all of the functions may be implemented by use of hardware that is a combination of, for example, logic circuits and analog circuits.

The estimation apparatus 30 performs at least a direction estimation routine described below, and a control task for assisting driver's driving on the basis of the estimated moving direction of an object.

The control execution unit 20 uses various in-vehicle devices according to outputs from the estimation apparatus 30 to (1) Provide audible and/or visible information to the driver, such as information about an estimated moving direction of an object (2) Execute various vehicle control tasks required for driver's driving assist, such as avoidance of collision with the object.

(2. Processing)
(2-1. Direction Estimation Routine)

Figure 3:
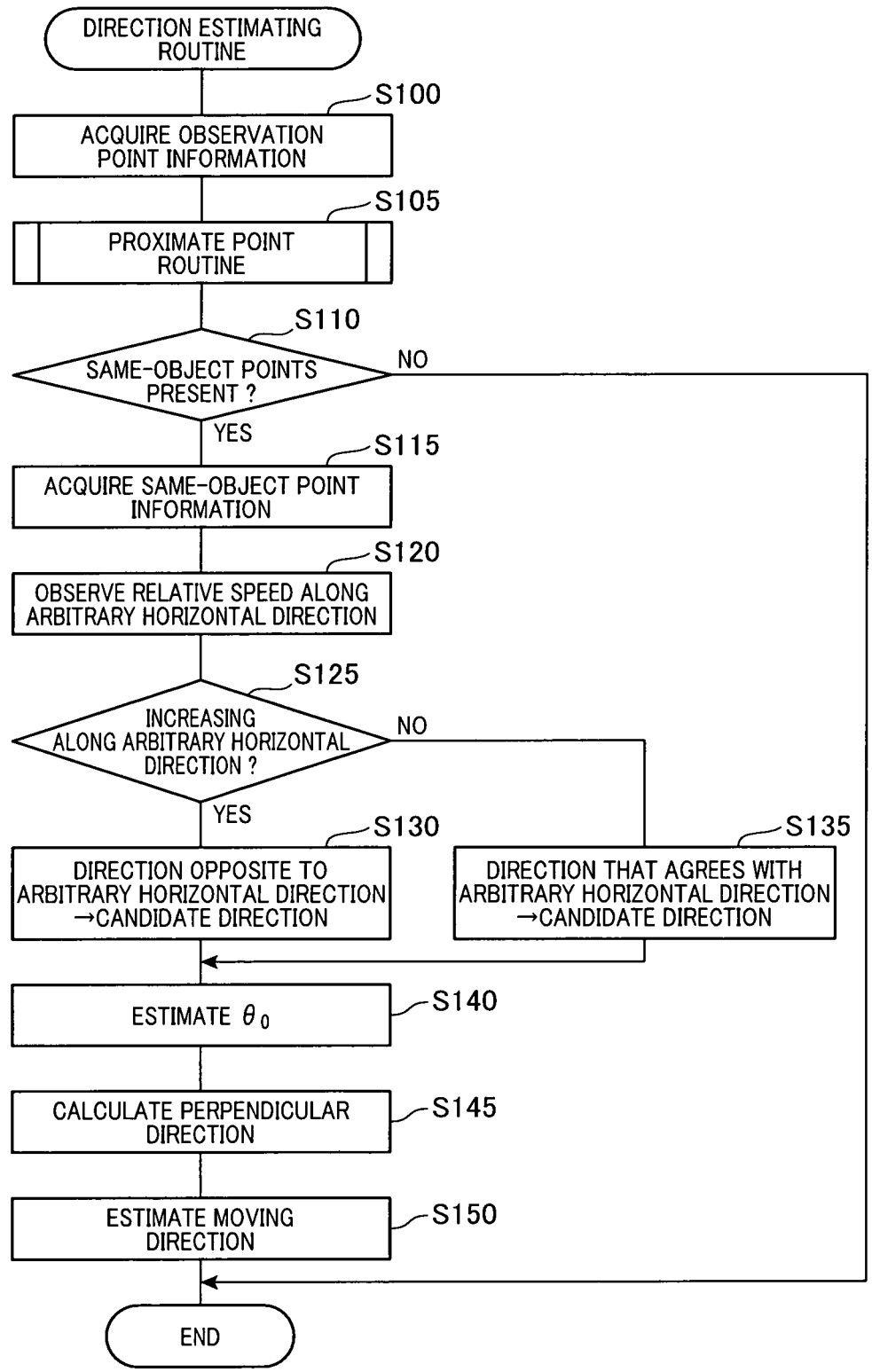
FIG. 3 is a flowchart illustrating a direction estimation routine.

The following describes a direction estimation routine performed by the estimation apparatus 30 with reference to the flowchart of FIG. 3. Description of the control task for the driver's driving assist is omitted because the control task is well known, and therefore description herein is specifically focused on the direction estimation routine.

The present direction estimation routine is configured to estimate a moving direction of an object located within the detection range in accordance with correlation information for each observation point input from the radar sensor 10. The following describes an example of estimating the moving direction of a vehicle as an object. The direction estimation routine is started upon start of an engine of the own vehicle, and executed in a predetermined period.

Upon start of the direction estimation routine, the estimation apparatus 30 acquires, in step S100, information about observation points from the radar sensor 10. The estimation apparatus 30 stores, in the memory 32, the acquired information about the observation points.

Next, in step S105, the estimation apparatus 30 performs a proximate point task. The proximate point task refers to a task of specifying proximate points. The proximate points refer to observation points close to each other. The phrase "observation points close to" refers to, for example, the distance between the observation points being less than a predetermined distance.

As described below, the proximate point task of the present embodiment specifies, based on the reflection intensity of each observation point, proximate points in the observation points; the differences in reflection intensity among the proximate points are less than a predetermined intensity threshold. The proximate point task stores, in the memory 32, proximate point information if proximate points are specified. The term "proximate point information" refers to information about each specified proximate point corresponding to one of the observation points.

Subsequently, the estimation apparatus 30 determines, in step S110, whether there are same-object points. The term "same-object points" refer to observation points on a same object, i.e. a single object, which have reflected the radar waves outputted from the radar sensor 10 i.e. the radar waves outputted from the own vehicle 100. The term "object" herein refers to an object that has reflected radar waves so that the object is detected based on reflected radar waves. For example, objects include various types of moving tangible objects, such as vehicles or pedestrians.

The estimation apparatus 30 uses the proximate points specified in the proximate point task in step S105 as the same-object points. Specifically, the estimation apparatus 30 determines that there are same-object points if the proximate point information has been stored in the memory 32.

If there are no same-object points, the estimation apparatus 30 terminates the present direction estimation routine. If there are same-object points, the direction estimation routine proceeds to step S115.

In step S115, the estimation apparatus 30 acquires same-object information. The term "same-object information" refers to information showing the correlated horizontal azimuth and relative speed of each same-object point relative to the own vehicle 100. As mentioned above, the proximate points are used as the same-object points. Specifically, in accordance with the proximate point information specified in step S105, the estimation apparatus 30 extracts, from the observation point information, the correlated horizontal azimuth and relative speed of each proximate point relative to the own vehicle 100. Then, the estimation apparatus 30 stores the extracted information in the memory 32 as same-object information.

Next, the estimation apparatus 30 estimates a candidate direction based on the same-object information in step S120 to S135. The term "candidate direction" refers to a direction set for estimating the moving direction of an object i.e. a candidate direction of the moving direction of an object.

Figure 4:
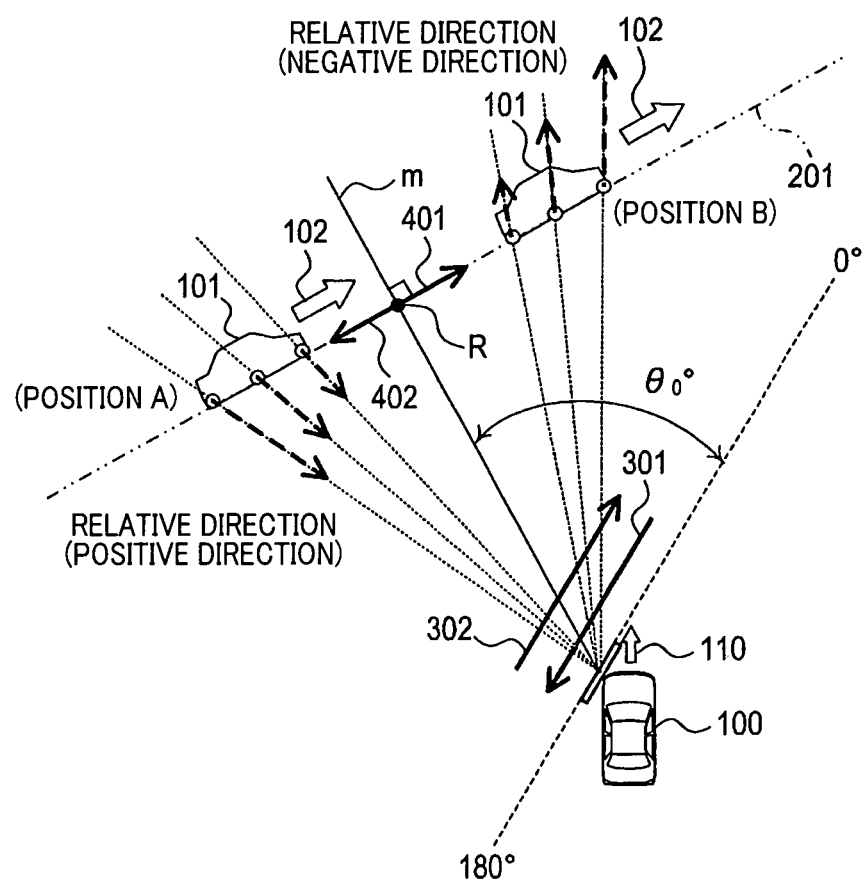
FIG. 4 is a diagram illustrating a relative direction and a relative speed of an object when the object moves from 180 degrees toward 0 degrees in azimuth of the radar sensor.
Figure 5:
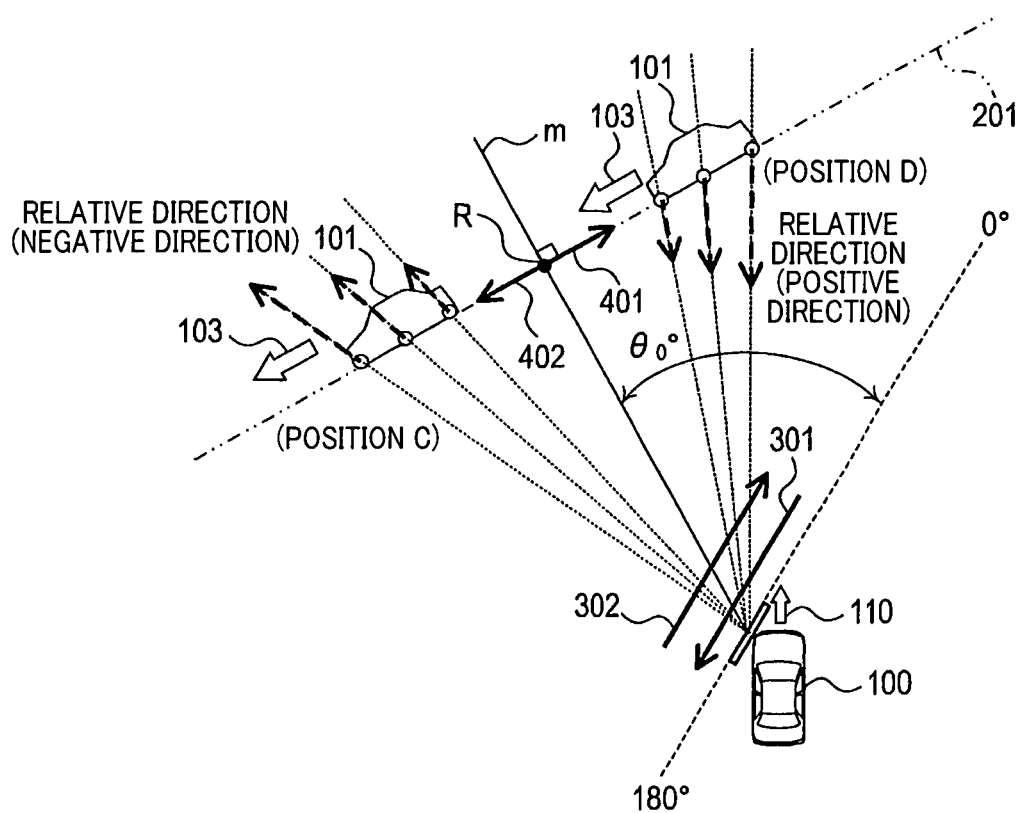
FIG. 5 is a diagram illustrating a relative direction and a relative speed of an object when the object moves from 0 degrees toward 180 degrees in azimuth of the radar sensor.

Before describing individual steps, the following describes a method of estimating a candidate direction with reference to FIGS. 4 and 5.

FIGS. 4 and 5 each show a trajectory of the same-object points of an object 101 as a straight movement line 201. The trajectory can be observed when the object 101 is assumed to move in a moving direction indicated by the white arrows 102 in FIG. 4 or the white arrows 103 in FIG. 5. The same-object points on the object 101 are indicated by three white circles on the object 101. The relative speeds correlated to the respective same-object points are indicated by the arrowed thick dashed lines extending from the respective same-object points. The length of each thick dashed line indicates the magnitude of the relative speed.

The moving direction of each same-object point relative to the own vehicle 100 is referred to as a relative direction. The relative direction, when directed toward the own vehicle 100, is termed a positive direction, and when directed away from the own vehicle 100, termed a negative direction. When the relative direction is the positive direction, the speed of each same-target point relative to the own vehicle 100 is indicated as a positive value, and when the relative direction is the negative direction, indicated as a negative value.

In FIGS. 4 and 5, as indicated by the arrow 110, the own vehicle 100 is assumed to be moving in the forward direction of the own vehicle 100 as the traveling direction. Furthermore, the same-object points, or the object 101 including the same-object points, is assumed to be moving in a direction indicated by the arrows 102 of FIG. 4 or the arrows 103 of FIG. 5 along the straight movement line 201.

When the same-object points move with the movement of the object 101, the relative speed observed at each same-object point on the moving object 101 changes with the movement of the object 101 even if the own vehicle 100 and the object 101 is performing a uniform linear motion.

Specifically, the relative speed observed at each same-object point on the moving object 101 changes from positive to negative at a boundary point R on the straight movement line 201 with the movement of the object 101 along the straight movement line 201. The boundary point R is defined as a point where the relative speed is zero.

The boundary point R is correlated to zero as a magnitude of the relative speed. The magnitude of the relative speed observed for each same-object point become closer to zero, as the object 101 is located closer to the boundary point R. In other words, the magnitude of the relative speed of each same-object point becomes closer to zero, as the corresponding same-object point is positioned closer to the boundary point R. The term "magnitude of the relative speed" herein refers to a relative speed excluding a sign i.e. an absolute value of the relative speed.

The estimation apparatus 30 estimates a candidate direction as follows. Specifically, the estimation apparatus 30 continuously observes the relative speed of each same-object point along an arbitrary horizontal direction, e.g., in the direction from 0 degrees toward 180 degrees in the radar sensor 10. Then, upon determining, based on the observation, that the relative speed gradually decreases along the arbitrary horizontal direction, the estimation apparatus 30 estimates the direction that agrees with the arbitrary horizontal direction as a candidate direction. Otherwise, upon determining, based on the observation, that the relative speed gradually increases along the arbitrary horizontal direction, the estimation apparatus 30 estimates the direction that is opposite to the arbitrary horizontal direction as a candidate direction.

Returning to FIG. 2, the following describes the remaining steps.

The estimation apparatus 30 continuously observes, in step S120, the relative speed of each same-object point along an arbitrary horizontal direction.

The term "arbitrary horizontal direction" refers to a direction in which one azimuth is horizontally changed to another azimuth. Specifically, in the present embodiment, the following uses, as the arbitrary direction, a direction from 0 degrees toward 180 degrees in the radar sensor 10, as indicated by the arrow 301 in FIG. 4. That is, the direction in which the azimuth in the radar sensor 10 increases is set as the arbitrary horizontal direction.

The arbitrary horizontal direction is not limited to the direction in which the azimuth in the radar sensor 10 increases. For example, as indicated by the arrow 302 in FIG. 4, the direction of the azimuth of 180 degrees toward 0 degrees in the radar sensor 10 can be set as the arbitrary horizontal direction.

The term "observation" herein refers to observing the relative speeds related to their azimuths.

Specifically, the estimation apparatus 30 uses the azimuth and the relative speed of each same-object point to thereby calculate, for the corresponding same-object point, a linear formula (termed regression formula hereinafter) expressing a straight line (termed regression line hereinafter); the regression line for each same-object point enables a relative speed of the same-object point to be estimated from the azimuth of the same-object point.

Then, the estimation apparatus 30 performs observation using the gradient of each regression line. Each of FIGS. 6 to 9 illustrates a regression line when the object 101, while moving, is located at a corresponding one of positions A to D of FIGS. 4 and 5. The regression lines are each expressed by the azimuth and the relative speed of each same-object point.

Next, the estimation apparatus 30 observes successively the relative speeds of the respective same-object points along the arbitrary horizontal direction in step S120 to thereby determine, in step S125, whether the relative speeds gradually increase along the arbitrary horizontal direction. Specifically, the estimation apparatus 30 determines that the relative speeds along the arbitrary horizontal direction gradually increase upon determining that the gradient of the regression line expressed by the regression formula is positive.

If the relative speeds along the arbitrary horizontal direction gradually increase, the direction estimation routine proceeds to step S130. In other words, if the inclination of the regression line is positive, the direction estimation routine proceeds to step S130.

The estimation apparatus 30 estimates, in step S130, the direction opposite to the arbitrary horizontal direction as a candidate direction. As described above, the estimation apparatus 30 according to the present embodiment determines the direction from the azimuth of 0 degrees toward 180 degrees in the the radar sensor 10 as the arbitrary horizontal direction. The estimation apparatus 30 estimates the direction opposite to this as a candidate direction. That is, the estimation apparatus 30 estimates the direction from the azimuth of 180 degrees toward 0 degrees in the radar sensor 10 as a candidate direction. Then, the direction estimation routine proceeds to S140.

Otherwise, if the relative speeds along the arbitrary horizontal direction gradually decrease, the direction estimation routine proceeds to step S135. In other words, if the inclination of the regression line is negative, the direction estimation routine proceeds to step S135.

The estimation apparatus 30 estimates, in step S135, the arbitrary horizontal direction as a candidate direction. That is, the estimation apparatus 30 determines the direction from the azimuth of 0 degrees toward 180 degrees in the radar sensor 10 as a candidate direction. Then, the direction estimation routine proceeds to S140.

In step S140, the estimation apparatus 30 estimates a zero azimuth. The term "zero azimuth" refers to an azimuth where the relative speed is correlated to zero. That is, as shown in FIGS. 4 and 5, the azimuth of the boundary point R corresponds to the zero azimuth $\theta_0$.

The estimation apparatus 30 derives the rate of change of the relative speeds along the arbitrary horizontal direction from the result of sequential observation of the relative speeds of the respective same-object points along the arbitrary horizontal direction to thereby estimate the zero azimuth $\theta_0$ based on the rate of change of the relative speeds along the arbitrary horizontal direction.

Specifically, the estimation apparatus 30 uses, as the rate of change of the relative speeds along the arbitrary horizontal direction, the gradient of the corresponding regression line expressed by the regression formula, thus correspondingly calculate an azimuth at which the corresponding relative speed is zero as the zero azimuth $\theta_0$.

Following the operation in step S140, the estimation apparatus 30 calculates, in step S145, a direction perpendicular to the zero azimuth $\theta_0$. As indicated by the arrows 401 and 402 in each of FIGS. 4 and 5, two directions in the horizontal direction perpendicular to the zero azimuth $\theta_0$ are calculated.

The estimation apparatus 30 estimates, as the moving direction of the object 101, a selected one of the two directions perpendicular to the zero azimuth $\theta_0$ calculated in step S145; the selected one of the two directions is matched with the candidate direction in step S150, and thereafter, terminates the direction estimation routine.

That is, the estimation apparatus 30 first estimates a candidate direction, and then selects, among the directions perpendicular to the straight line indicative of the zero azimuth $\theta_0$, one of the directions; the selected direction is matched with the candidate direction, thus estimating the selected direction as a moving direction. This estimation operation is based on a principle that the straight line indicative of the zero azimuth $\theta_0$ that expresses an orientation toward the boundary point R is perpendicular to the moving direction of the object 101; the magnitude of the relative speed at the boundary point R is correlated to zero.

The following describes the principle.

Specifically, in FIG. 2, the azimuth where a point $K_1$ is present is taken to be an azimuth $\theta$. The point $K_1$ is one of the same-object points on the object 101 detected by the radar sensor 10. In addition, the angle formed by a straight line I indicating the azimuth $\theta$ and the straight movement line 201 is taken to be an angle $\phi$. The angle $\phi$ is expressed by the following formula (1) in accordance with the azimuth $\theta$ and the zero azimuth $\theta_0$, where $\theta_0$, $\theta$, and $\phi$ each have a unit of degree.

$$\phi=180°-90°-(\theta-\theta_0) \qquad (1)$$

When $\theta=\theta_0$ is satisfied, $\phi$ becomes 90 degrees. Accordingly, a relative speed $V_s$ observed at the same-object point $K_1$ is indicated as 0 as in the following formula (2):

$$V_s=V_t\times\cos\phi=0 \qquad (2)$$

where $V_t$ indicates the speed of the object 101. In other words, $V_t$ corresponds to the speed of the same-object point $K_1$. The speed $V_t$ and the relative speed $V_s$ each have a unit of km/hour.

Thus, it is clear that a straight line m indicating the zero azimuth $\theta_0$, where the relative speed $V_s$ is zero, is perpendicular to the straight movement line 201 indicating the moving direction of the object 101.

(2-2. Proximate Point Specifying Subroutine)

Next, the following describes the proximate point specifying subroutine executed by the estimation apparatus 30 in step S105 of the direction estimation routine with reference to the flowchart of FIG. 10.

The estimation apparatus 30 determines, in step S200, whether the observation points acquired in step S100 include observation points whose reflection intensities correlated thereto are each equal to or greater than a predetermined detection threshold.

The term "detection threshold" refers to a value for extracting, among the observation points acquired in step S100, observation points that have a possibility of being located on the object 101 whose moving direction is to be estimated. For example, the reflection intensity correlated to an observation point located on the object 101 is probably assumed to be greater than the reflection intensity correlated to an observation point on the surface of the road (termed road surface hereinafter).

In this regard, the detection threshold according to the present embodiment is set to be greater than the reflection intensity correlated to an observation point on the road surface. However, the detection threshold is not limited thereto, but can be freely determined. The detection threshold is stored in the memory 32 in advance.

The estimation apparatus 30 carries out the operation in step S250 upon determining that there are no observation points whose correlated reflection intensities are each equal to or greater than the predetermined detection threshold. Otherwise, the estimation apparatus 30 carries out the operation in step S210 upon determining that there are observation points whose correlated reflection intensities are each equal to or greater than the predetermined detection threshold.

In step S210, the estimation apparatus 30 determines, among the observation points extracted in step S200, whether there are observation points whose difference between their correlated azimuths is less than a predetermined azimuth threshold. That is, the estimation apparatus 30 determines whether the azimuths of the respective observation points extracted in step S200 are close to each other, e.g., adjacent to each other.

The term "azimuth threshold" refers to a value for discriminating the difference in magnitude between azimuths of observation points. The azimuths of the observation points on a same object, such as adjacent azimuths, are probably assumed to be roughly the same as each other. From this viewpoint, the azimuth threshold is set to indicate a difference between azimuths that are roughly the same as each other. The azimuth threshold can be freely determined depending on the distance to the object 101, whose moving direction is to be estimated, from the own vehicle 100 and the size of the object 101. The azimuth threshold is stored in the memory 32 in advance.

Upon determining, among the observation points extracted in step S200, that there are observation points whose difference between their correlated azimuths is equal to or more than the predetermined azimuth threshold, the estimation apparatus 30 determines that the observation points are located being distanced from each other, and carries out the operation in step S250.

Otherwise, upon determining, among the observation points extracted in step S200, that there are observation points whose difference between their correlated azimuths is less than the predetermined azimuth threshold, the estimation apparatus 30 determines that the observation points are located close to each other, and carries out the operation in step S220. The estimation apparatus 30 stores the observation points determined to be located close to each other into the memory 32, as detected observation points.

In step S220, the estimation apparatus 30 acquires a reflection intensity of each detected observation point to thereby extract a maximum reflection intensity $P_{max}$ and a minimum reflection intensity $P_{min}$, thus storing the maximum reflection intensity $P_{max}$ and a minimum reflection intensity $P_{min}$ in the memory 32; the maximum reflection intensity $P_{max}$ and minimum reflection intensity $P_{min}$ respectively show the maximum value and the minimum value in the acquired reflection intensities.

The estimation apparatus 30 determines, in step S230, whether the detected observation points are proximate points.

That is, upon determining that the difference of the maximum intensity $P_{max}$ from the minimum reflection intensity $P_{min}$ is less than the predetermined intensity threshold, the estimation apparatus 30 determines that the extracted detected observation points are proximate points.

The term "intensity threshold" refers to a value for discriminating the difference in magnitude between reflection intensities of the radar waves. The reflection intensities of the radar waves from a same object in enough close azimuths, i.e. adjacent azimuths, are probably assumed to be similar to each other. For this reason, the intensity threshold can be set to be not more than the maximum of the differences in reflection intensities of a same object. The intensity threshold depends on the type of an object that is set as the object 101, whose moving direction is to be estimated. The intensity threshold is stored in the memory 32 in advance.

Note that, because a vehicle is detected as the object 101 according to the present embodiment, the intensity threshold is set to be not more than the difference between the maximum and the minimum of the reflection intensities of a generally used vehicle body.

Upon determining that the detected observation points are proximate points, the estimation apparatus 30 carries out the operation in step S240. Otherwise, determining that the detected observation points are not proximate points, the estimation apparatus 30 carries out the operation in step S250.

In step S240, the estimation apparatus 30 stores proximate point information in the memory 32; the proximate point information indicates that each of the detected observation points specified as a corresponding proximate point agrees with which of the observation points.

In step S250, the estimation apparatus 30 deletes the proximate point information stored in the memory 32, and terminates the proximate point specifying subroutine.

(2-3. Operation)

The following describes how the present embodiment works.

(2a) The following describes a case where an object 101 including same-object points is observed at the position A in FIG. 4.

The estimation apparatus 30 sets a direction in which the azimuth increases from 0 degrees toward 180 degrees in the radar sensor 10 as an arbitrary horizontal direction, and continuously observes the relative speed of each same-target point along the arbitrary horizontal direction.

Figure 6:
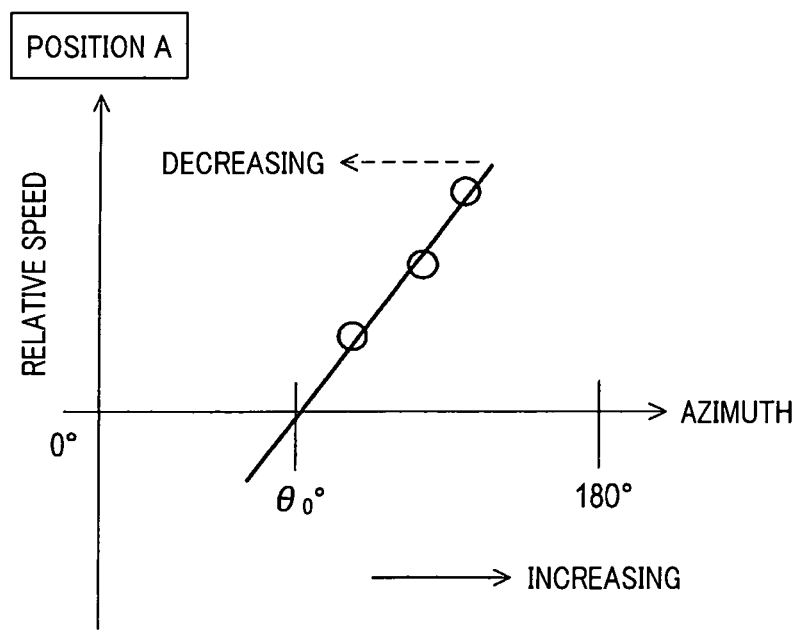
FIG. 6 is a diagram illustrating a regression line based on the azimuth and relative speed of each same-object point of an object located at a position A.

As shown in FIG. 6, the relative speeds gradually increase along the arbitrary horizontal direction. The direction opposite to the arbitrary horizontal direction i.e. the direction from 180 degrees toward 0 degrees in the radar sensor 10 indicated by the arrow 302 is therefore estimated as a candidate direction.

This enables a selected one of the directions perpendicular to the straight line m indicating the zero azimuth $\theta_0$, i.e. a selected one of the directions in which the straight movement line 201 extends, to be estimated as the moving direction of the object 101; the selected one of the directions is matched with, i.e. comply with, the candidate direction indicated by the arrow 401.

The following describes a case where the direction in which the azimuth decreases from 180 degrees toward 0 degrees in the radar sensor 10 is set as an arbitrary horizontal direction, which is different from the present embodiment described above. In this case, as shown in FIG. 6, the relative speeds gradually decrease along the arbitrary horizontal direction. The direction that agrees with the arbitrary horizontal direction i.e. the direction from 180 degrees toward 0 degrees in the radar sensor 10 indicated by the arrow 302 is estimated as a candidate direction. Thus, the direction indicated by the arrow 401 is estimated as the moving direction of the object 101.

Setting any one of the azimuth increasing direction and the azimuth decreasing direction as the arbitrary horizontal direction enables the candidate direction and the moving direction to be similarly estimated. The same applies to the following (2b) to (2c).

(2b) The following describes a case where an object 101 including same-object points are observed at the position B in FIG. 4.

Figure 7:
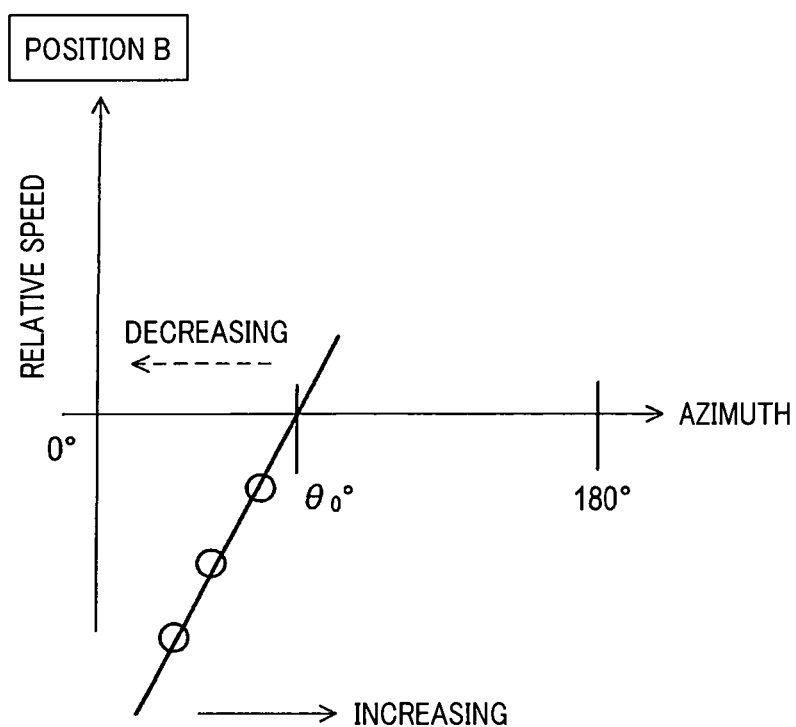
FIG. 7 is a diagram illustrating a regression line based on the azimuth and relative speed of each same-object point of the object located at a position B.

Setting a direction in which the azimuth increases from 0 degrees toward 180 degrees in the radar sensor 10 as an arbitrary horizontal direction causes the relative speeds along the arbitrary horizontal direction to gradually increase, as shown in FIG. 7. In this case, the direction opposite to the arbitrary horizontal direction i.e. the direction of the azimuth from 180 degrees toward 0 degrees in the radar sensor 10 indicated by the arrow 302 is estimated as a candidate direction. Thus, similar to (2a), the direction indicated by the arrow 401 is estimated as the moving direction of the object 101.

(2c) The following describes a case where an object 101 including the same-object points is observed at the position C of FIG. 5.

Figure 8:
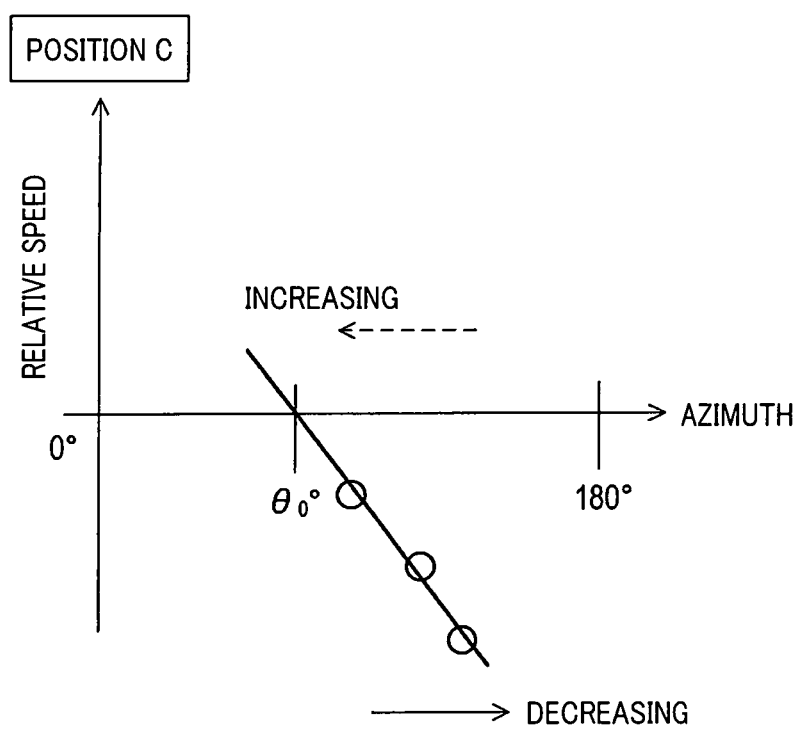
FIG. 8 is a diagram illustrating a regression line based on the azimuth and relative speed of each same-object point of the object located at a position C.

Setting a direction in which the azimuth increases from 0 degrees toward 180 degrees in the radar sensor 10 as an arbitrary horizontal direction causes the relative speeds along the arbitrary horizontal direction to gradually decrease, as shown in FIG. 8. For this reason, the direction that is matched with the arbitrary horizontal direction, i.e. the direction from 0 degrees toward 180 degrees in the radar sensor 10, indicated by the arrow 301 is estimated as a candidate direction. Thus, the direction indicated by the arrow 402 is estimated as the moving direction of the object 101.

(2d) The following describes a case where an object 101 including the same-object points is observed at the position D of FIG. 5.

Figure 9:
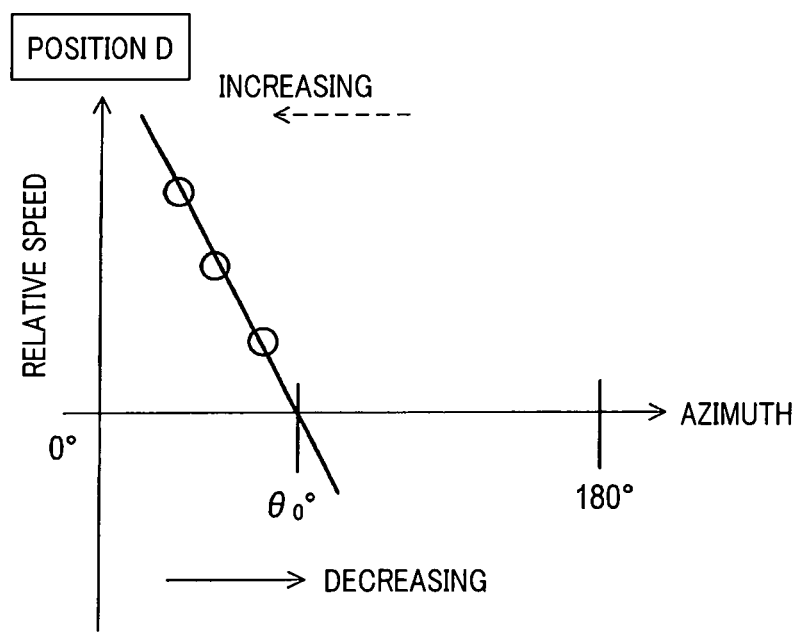
FIG. 9 is a diagram illustrating a regression based on the azimuth and relative speed of each same-object point of the object located at a position D.

Setting a direction in which the azimuth increases from 0 degrees toward 180 degrees in the radar sensor 10 as an arbitrary horizontal direction causes the relative speeds along the arbitrary horizontal direction to gradually decrease, as shown in FIG. 9. In this case, the direction that is matched with the arbitrary horizontal direction i.e. the direction from 0 degrees toward 180 degrees in the radar sensor 10 indicated by the arrow 301 is estimated as a candidate direction. Thus, similar to (2c), the direction indicated by the arrow 402 is estimated as the moving direction of the object 101.

(3. Advantageous Effects)

The present embodiment specifically described above provides the following advantageous effects.

(3a) The estimation apparatus 30 obtains same-object points, and sequentially observes the relative speeds of the respective same-object points along an arbitrary horizontal direction. Upon determining that the relative speeds gradually decrease along the arbitrary horizontal direction, the estimation apparatus 30 estimates the direction that is matched with the arbitrary horizontal direction as a candidate direction. Otherwise, upon determining that the relative speeds gradually increase along the arbitrary horizontal direction, the estimation apparatus 30 estimates the direction opposite to the arbitrary horizontal direction as a candidate direction. The estimation apparatus 30 estimates the moving direction of the object 101 based on the estimated candidate direction.

That is, the estimation apparatus 30 obtains information on observation points located on a same object 101, and estimates, based on the information, the moving direction of the object 101. This eliminates the need to acquire the information on these observation points a plurality of times with time, for estimating the moving direction of the object 101. That is, the estimation apparatus 30 makes it possible to estimate the moving direction of an object 101 in a shorter time than in the conventional technique that needs to acquire the information on the observation points a plurality of times with time.

(3b) The estimation apparatus 30 can estimate the zero azimuth $\theta_0$ where the relative speed is zero based on the rate of change of the relative speeds along the arbitrary horizontal direction derived from the result of sequential observation of the relative speeds of the respective same-object points along the arbitrary horizontal direction. In addition, the estimation apparatus 30 can estimate a direction along a candidate direction as the moving direction of the object 101, from among the directions perpendicular to the zero azimuth $\theta_0$.

This results in the moving direction being estimated with higher accuracy.

(3c) The estimation apparatus 30 can acquire information showing the reflection intensity, distance, and azimuth of each observation point with the relative speed of the corresponding observation point. The estimation apparatus 30 can specify, among observation points, proximate points having (1) Their correlated azimuths whose difference is less than the predetermined azimuth threshold (2) Their correlated reflection intensities whose difference is less than a predetermined intensity threshold The estimation apparatus 30 can use same-object points as proximate points, and acquire information that shows correlation between the horizontal azimuth and the relative speed of each of the same-object points.

This makes it possible to determine whether observation points are same-target points without the need of additional components other than the radar sensor 10.

Note that, in the present embodiment, the estimation apparatus 30 corresponds to the observation point acquiring section, the specifying section, the same-object point information acquiring section, the candidate estimating section, the zero-estimating section, and the direction estimating section. In addition, the operation in step S100 corresponds to a task as the observation point acquiring section, the operation in step S105 corresponds to a task as the specifying section, and the operation in step S115 corresponds to a task as the stable point information acquiring section. The operations in steps S130 and S135 correspond to a task as the candidate estimating section, the operation in step S140 corresponds to a task as the zero-estimating section, and the operation in step S150 corresponds to a task as the direction estimating section.

(4. Modifications)

The estimation apparatus 30 according to the present embodiment is configured to specify proximate points in the proximate point task in accordance with the azimuths and the reflection intensities of the respective observation points, but the present disclosure is not limited thereto.

(4-1. First Modification)

For example, as shown in FIG. 11, an estimation apparatus 30 according to a first modification can specify proximate points in accordance with the azimuths and distances of the respective observation points. Because the operations in steps S200 to S210 of FIG. 11 are similar to step S00 to S210 of FIG. 10, the descriptions of the operations in step S200 to S210 are omitted.

Following the determination that the observation points having being detected, the estimation apparatus 30 acquires a distance for each of the detected observation points to thereby extract a maximum distance $D_{max}$ and a minimum distance $D_{min}$, thus storing the maximum distance $D_{max}$ and minimum distance $D_{min}$ in the memory 32; the maximum distance $D_{max}$ and minimum distance $D_{min}$ respectively show the maximum value and the minimum value in the acquired distances.

The estimation apparatus 30 determines, in step S235, whether the detected observation points are proximate points.

Specifically, upon determining that the difference of the maximum distance $D_{max}$ from the minimum distance $D_{min}$ is less than a predetermined distance threshold, the estimation apparatus 30 determines that the extracted detected observation points are detection points.

The term "distance threshold" refers to a value for discriminating the difference in length between distances. The distances observed for the respective same-object points reflecting the radar waves are probably estimated to be similar to each other as long as the same-object points have similar azimuths, such as adjacent azimuths. Thus, the distance threshold can be determined to be not more than the maximum value of the differences between the distances that can be observed on the same object 101 whose moving direction is to be estimated. That is, the distance threshold can be set to not more than the size of the object 101.

The distance threshold depends on the type of an object that is set as the object 101, whose moving direction is to be estimated. The distance threshold can be set to be equal to or less than the longitudinal length of the vehicle body, and is stored in the memory 32 in advance.

Upon determining that the detected observation points are proximate points, the estimation apparatus 30 executes the operation in step S245, and otherwise upon determining that the detected observation points are not proximate points, the estimation apparatus 30 executes the operation in step S250.

In step S245, the estimation apparatus 30 stores proximate point information in the memory 32; the proximate point information indicates that each of the detected observation points specified as a corresponding proximate point agrees with which of the observation points. Then, the estimation apparatus 30 terminates the proximate point specifying subroutine.

In step S250, the estimation apparatus 30 performs a task similar to the task illustrated in FIG. 10, and thereafter terminates the proximate point specifying task.

In accordance with the distance and azimuth of each observation point, the estimation apparatus 30 is capable of specifying, among the detected observation points, proximate points having (1) Their correlated azimuths whose difference is less than the predetermined azimuth threshold
(2) Their correlated reflection intensities whose difference is less than the predetermined intensity threshold The above first modification achieves the advantageous effects similar to those mentioned in (3c). Note that the operations in steps S210 and S235 correspond to a task as the specifying section.

(4-2. Second Modification)

An estimation apparatus 30 according to a second modification can specify proximate points in accordance with the reflection intensities and distances of the respective observation points.

Specifically, in accordance with the reflection intensity and distance of each observation point, the estimation apparatus 30 is capable of specifying, among the detected observation points, proximate points having (1) Their correlated reflection intensities whose difference is less than the predetermined intensity threshold
(2) Their correlated distances whose difference is less than the predetermined distance threshold In this second modification, the proximate point specifying subroutine illustrated in FIG. 10 can be configured such that (1) The operation in step S210 is deleted
(2) The operations like the operations in steps S225 and S235 illustrated in FIG. 11 are added after the operation in step S230
(3) Affirmative determination in step S235 is shifted to, step S240

(4-3. Third Modification)

An estimation apparatus 30 according to a third modification can specify proximate points in accordance with the azimuths, reflection intensities, and distances of the respective observation points.

Specifically, the estimation apparatus 30 is capable of specifying, among the detected observation points, proximate points having (1) Their correlated azimuths whose difference is less than the predetermined azimuth threshold
(2) Their correlated reflection intensities whose difference is less than the predetermined intensity threshold
(3) Their correlated distances whose difference is less than the predetermined distance threshold In this third modification, the proximate point specifying subroutine illustrated in FIG. 10 can be configured such that (1) The operations like the operations in steps S225 and S235 illustrated in FIG. 11 are added after the operation in step S230
(2) Affirmative determination in step S235 is shifted to step S240

(4-4. Fourth Modification)

An estimation apparatus 30 according to a fourth modification can specify proximate points in accordance with only the azimuths of the respective observation points.

Specifically, the estimation apparatus 30 is capable of specifying, among the detected observation points, proximate points having their correlated azimuths whose difference is less than the predetermined azimuth threshold.

In this fourth modification, the proximate point specifying subroutine illustrated in FIG. 10 can be configured such that (1) The operations in steps S220 and 230 are eliminated
(2) Affirmative determination in step S210 is shifted to step S240

(4-5. Fifth Modification)

An estimation apparatus 30 according to a fifth modification can specify proximate points in accordance with only the reflection intensities of the respective observation points.

Specifically, the estimation apparatus 30 is capable of specifying, among the detected observation points, proximate points having their correlated reflection intensities whose difference is less than the predetermined intensity threshold.

In this fifth modification, the proximate point specifying subroutine illustrated in FIG. 10 can be configured such that the operation in step S210 is eliminated.

(4-6. Sixth Modification)

An estimation apparatus 30 according to a sixth modification can specify proximate points in accordance with only the distances of the respective observation points.

Specifically, the estimation apparatus 30 is capable of specifying, among the detected observation points, proximate points having their correlated distances whose difference is less than the predetermined distance threshold.

In this sixth modification, the proximate point specifying subroutine illustrated in FIG. 11 can be configured such that the operation in step S210 is eliminated.

(4-7. Seventh Modification)

An estimation apparatus 30 according to a seventh modification can be configured such that the operation in step S200 is eliminated from the proximate point specifying subroutine illustrated in FIG. 10. Specifically, the estimation apparatus 30 can specify, among the observation points, proximate points having (1) Their correlated azimuths whose difference is less than the predetermined azimuth threshold (2) Their correlated reflection intensities whose difference is less than the predetermined intensity threshold In each of the first to sixth modifications, like the seventh modification, the operation in step S200 can be deleted from the proximate point specifying subroutine.

(5. Other Modifications)

The present embodiment for embodying the present disclosure has been described. Various modifications can be implemented without being limited to the present embodiment described above.

(5a) In the above embodiment, the estimation apparatus 30 estimates, as the moving direction of the object 101, a selected one of the two directions perpendicular to the zero azimuth $\theta_0$; the selected one of the two directions is matched with the candidate direction in step S150, but the estimation apparatus 30 is not limited thereto. For example, the estimation apparatus 30 can estimate the candidate direction estimated in steps S130 and S135 as the moving direction of the object 101 in place of the task in step S150. In this modification, the operations in steps S140 to S145 can be deleted from the flowchart of FIG. 3.

(5b) In the above embodiment, the detection range of the radar sensor 10 is set to a detectable range of 0 degrees to 180 degrees, but the detection range of the radar sensor 10 can be set to any range.

(5c) In the above embodiment, the azimuth of 0 degrees in the detection range is oriented to the front side of the own vehicle, but the azimuth of 0 degrees is not limited thereto. For example, the azimuth of 0 degrees in the detection range can be oriented to the rear side of the own vehicle.

(5d) The radar sensor 10 according to the above embodiment is located at a left end portion on the front side of the own vehicle, but the location of the radar sensor 10 is not limited thereto. The estimation apparatus 30 can be configured similarly to the above embodiment if the radar sensor 10 is provided at a right end portion on the front side of the own vehicle. The radar sensor 10 can be provided to at least one of the right and left end portions on the rear side of the own vehicle. The radar sensor 10 can be provided at least to one of the right and left end portions on the front and rear sides of the own vehicle. The vehicle control system 1 according to the above embodiment is configured to include the radar sensors 10, but the vehicle control system 1 is not limited thereto. Specifically, the vehicle control system 1 can be configured to include a single radar sensor 10 instead of plural radar sensors 10.

(5e) In the above embodiment, the intensity threshold is set to not more than the difference between the maximum value and the minimum value of the reflection intensities of the vehicle body, but the intensity threshold is not limited thereto. The intensity threshold can be set to any value depending on the surface configuration of an object 101 whose moving direction is to be estimated, such as a reflection coefficient of the surface of the object 101 or bumps and dips of the surface of the object 101.

(5f) In the above embodiment, the distance threshold is set, for example, to be not more than the longitudinal length of the vehicle body, but the distance threshold is not limited thereto. The distance threshold can be set to any value according to the size of the object 101 whose moving direction is to be estimated.

(5g) In the above embodiment, a vehicle is detected as the object 101, but the object 101 is not limited to a vehicle. The object 101 can be any moving tangible object.

(5h) The estimation apparatus 30 according to the present embodiment acquires observation information, and stores the observation information in the memory 32 in step S100, but the estimation apparatus 30 is not limited thereto. The estimation apparatus 30 can be configured to acquire, in step S100, at least azimuths and speeds relative to the vehicle from the pieces of observation information. Alternatively, the estimation apparatus 30 can be configured to acquire, in step S100, the azimuths, speeds, and at least one of the reflection intensities and distances from the pieces of observation information.

(5i) A plurality of functions of one component of the above embodiment can be implemented by a plurality of components, or one function of one component can be implemented by a plurality of components. A plurality of functions of a plurality of components can be implemented by one component, or one function implemented by a plurality of components may be implemented by one component. Furthermore, a part of the configuration of the above embodiment can be omitted. At least part of the configuration of the above embodiment can be added to another configuration of the above embodiment, or can be replaced with another configuration of the above embodiment. The embodiment of the present disclosure should encompass all the embodiments included in the technical idea specified only by the wording of the claims.

(5j) In addition to the estimation apparatus 30 and the vehicle control system 1 set forth above, the present disclosure can be implemented in various configurations, such as, programs for causing the estimation apparatus 30 to function, non-transitory tangible storage medium, such as a semiconductor memory storing the programs, or an estimation method.

The invention claimed is:

1. An estimation apparatus comprising:
a same-object point information acquiring section configured to acquire same-object information of same-object points in which a horizontal azimuth of each same-object point relative to a vehicle is correlated to a relative speed of a corresponding same-object point relative to the vehicle, the same-object points being located on a same object and each having reflected a radar wave;
a candidate estimating section configured to:
sequentially observe relative speeds of respective same-object points along an arbitrary horizontal direction;
estimate, as a first candidate direction, a direction that is matched with the arbitrary horizontal direction upon determining that the relative speeds gradually decrease along the arbitrary horizontal direction; and
estimate, as a second candidate direction, an opposite direction of the arbitrary horizontal direction upon determining that the relative speeds gradually increases along the arbitrary horizontal direction;
a direction estimating section configured to estimate a moving direction of the same object based on the first candidate direction or the second candidate direction; and
a zero-estimating section configured to estimate a straight line indicative of a zero azimuth that indicates an azimuth having a relative speed of zero in accordance with a rate of change of the relative speeds along the arbitrary horizontal direction derived from a result of a sequential observation of the relative speeds of the respective same-object points along the arbitrary horizontal direction, the straight line being defined to be perpendicular to the moving direction of the same object, wherein the direction estimating section is configured to estimate, among directions perpendicular to the straight line indicative of the zero azimuth, a direction that is matched with the first candidate direction or the second candidate direction as the moving direction of the same object.

2. The estimation apparatus according to claim 1, further comprising:

an observation point acquiring section configured to acquire information including at least one of a reflection intensity, an azimuth, and a distance of each of the observation points, the at least one of the reflection intensity, azimuth, and distance of a corresponding one of the observation points being correlated to the corresponding one of the observation points; and a specifying section configured to specify, based on the at least one of the reflection intensity, azimuth, and distance of each of the observation points, proximate points among the observation points such that:

at least one of a first difference between the correlated reflection intensities of the proximate points, a second difference between the correlated azimuths of the proximate points, and a third difference between the correlated distances of the proximate points is less than a corresponding at least one predetermined threshold, wherein the same-object point information acquiring means is configured to acquire, as the same-object information, information for each same-object point in which the horizontal azimuth of the corresponding same-object point is correlated to the relative speed of the corresponding same-object point.

3. The estimation apparatus according to claim 2, wherein:

the specifying section is configured to specify, based on the reflection intensity and azimuth of each of the observation points, the proximate points among the observation points such that:

the first difference between the correlated reflection intensities of the proximate points is less than a predetermined intensity threshold; and the second difference between the correlated azimuths of the proximate points is less than a predetermined azimuth threshold.

4. The estimation apparatus according to claim 2, wherein:

the specifying section is configured to specify, based on the azimuth and the distance of each of the observation points, the proximate points among the observation points such that:

the second difference between the correlated azimuths of the proximate points is less than a predetermined azimuth threshold; and the third difference between the correlated distances of the proximate points is less than a predetermined distance threshold.

5. A computer-implemented method for estimating a moving direction of an object, the computer-implemented method comprising:

acquiring same-object information of same-object points in which a horizontal azimuth of each same-object point relative to a vehicle is correlated to a relative speed of a corresponding same-object point relative to the vehicle, the same-object points being located on a same object and each having reflected a radar wave;

sequentially observing relative speeds of respective same-object points along an arbitrary horizontal direction;

estimating, as a first candidate direction, a direction that is matched with the arbitrary horizontal direction upon determining that the relative speeds gradually decrease along the arbitrary horizontal direction;

estimating, as a second candidate direction, an opposite direction of the arbitrary horizontal direction upon determining that the relative speeds gradually increases along the arbitrary horizontal direction;

estimating a moving direction of the same object based on the first candidate direction or the second candidate direction;

estimating a straight line indicative of a zero azimuth that indicates an azimuth having a relative speed of zero in accordance with a rate of change of the relative speeds along the arbitrary horizontal direction derived from a result of a sequential observation of the relative speeds of the respective same-object points along the arbitrary horizontal direction, the straight line being defined to be perpendicular to the moving direction of the same object; and estimating, among directions perpendicular to the straight line indicative of the zero azimuth, a direction that is matched with the first candidate direction or the second candidate direction as the moving direction of the same object.

* * * * *